March 19, 1946.  J. BLUE  2,396,980
FERTILIZER DISTRIBUTOR
Filed June 17, 1942  2 Sheets-Sheet 1

Inventor:
John Blue,
By Cushman, Darby & Cushman
Attorneys.

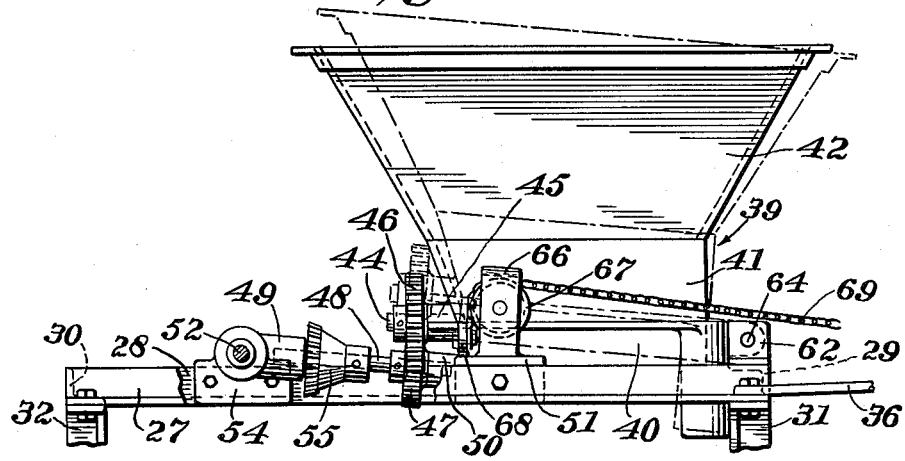

Patented Mar. 19, 1946

2,396,980

UNITED STATES PATENT OFFICE 2,396,980

FERTILIZER DISTRIBUTOR

John Blue, Laurinburg, N. C., assignor to John Blue Company, Laurinburg, N. C., a corporation of North Carolina Application June 17, 1942, Serial No. 447,391

6 Claims. (Cl. 111—67)

The present invention relates generally to agricultural implements and refers particularly to fertilizer distributors.

An object of the invention is the provision of a fertilizer distributor adapted to be detachably secured to a tractor having cultivating implements.

Another object is to provide a fertilizer attachment which is so constructed that elements of the tractor may be utilized to operate the distributor and to render the distributor mechanism inoperative when the cultivating implements of the tractor are rendered inoperative.

A further object is the provision of a frame which is so formed that it may be easily and quickly attached to the tractor to adequately support the distributor in both operative and inoperative positions of the latter.

Another object is the provision of a pair of distributor frames which may be mounted upon opposite sides of a tractor and connected to each other as well as to the sides of the tractor.

With the foregoing and other objects in view, the invention will now be more fully described, reference being had to the following drawings, in which:

Figure 3 is an enlarged elevation of the hopper and its frame and the means for lifting the hopper and disengaging the gears;

Figure 4 is a plan view of the hopper supporting frame,

Figure 5 is a modification of the means for lifting the hopper and disengaging the gears, and Fig. 6 is an end view of the hopper supporting frame.

Figure 2:
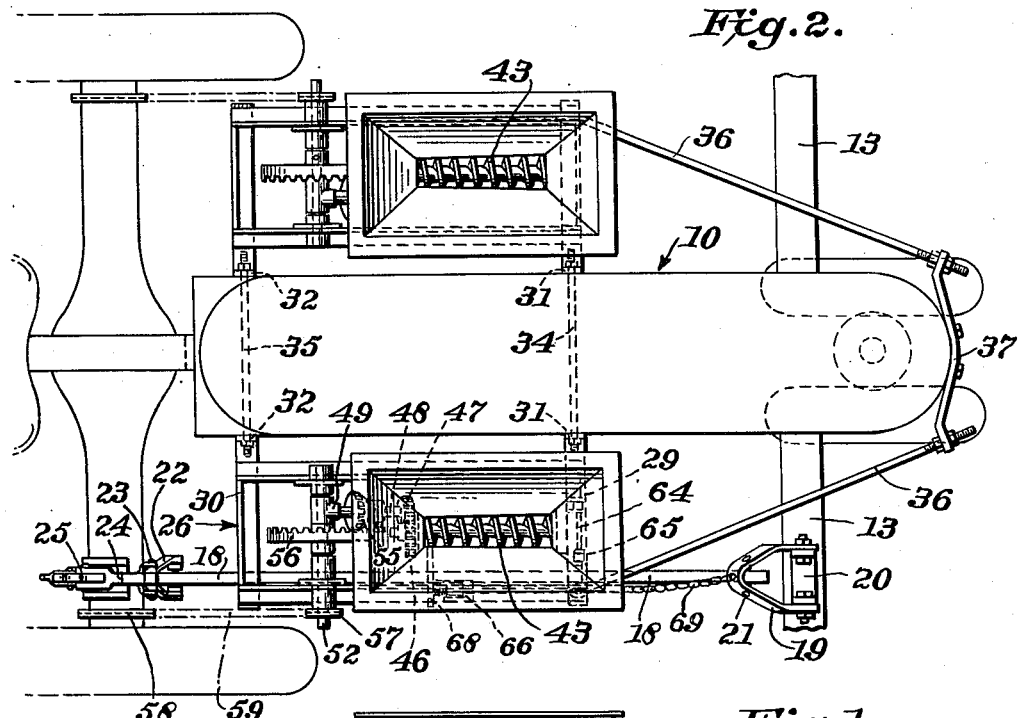
Figure 2 is a top plan view, showing a distributor mounted on each side thereof.
Figure 1:
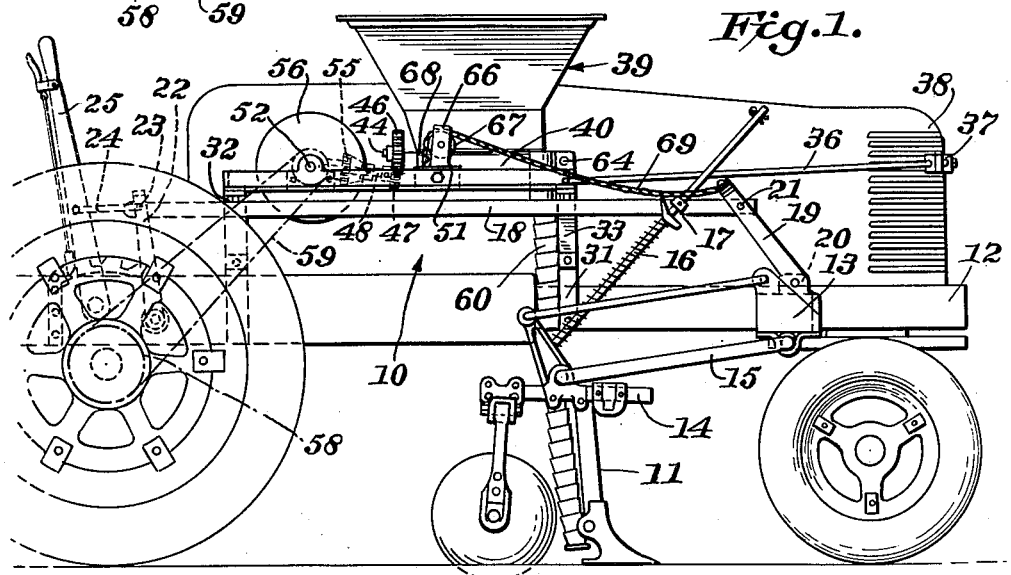
Figure 1 is a side elevation of a tractor with the distributing means attached thereto.

Referring to Figures 1 and 2 of the drawings, there is disclosed a tractor 10 with a pair of fertilizer or other distributors detachably secured to opposite sides thereof. This tractor may be one of the well-known types particularly adapted for farming and carrying cultivating implements, designated by the numeral 11. In the present instance, only those elements or parts of the tractor which cooperate with, or which are necessary to effect an operation of the same, are shown in detail. In this connection, the main frame or chassis 12 of the tractor is provided with laterally extending arms 13 fixed thereto adjacent the front of the tractor. Each of these arms constitutes the principal support for the cultivating implements 11. The sub-frame 14, upon which one set of the implements 11 is mounted, is pivotally connected to its respective arm 13 by means of a substantially U-shaped link 15. A pair of supporting arms 16 extend upwardly from the sub-frame 14 and pass through a bracket 17 secured adjacent the front of an operating bar 18. This bar extends longitudinally of one side of the tractor, as shown in Figures 1 and 2.

The numeral 19 designates a bifurcated link or yoke having downwardly diverging legs, each of which is pivoted to a bracket 20 secured to the supporting arm 13. The extreme front portion of the bar 18 passes through, and is pivotally connected to, the legs of the member 19 by means of a bolt or other fastening means 21. The rear end of the bar 18 is connected to the top of a bifurcated link or yoke 22 similar to the yoke 19. The bolt or other fastening means 23, by which the rear end of the rod is pivoted to the yoke 22, also pivotally supports the front of a link 24. The other end of this link is pivoted to a hand lever 25 which is utilized to operate and control the movement of the cultivator elements 11. When the lever 25 is moved forwardly, it will likewise move the longitudinal bar 18 forwardly. This will move the front yoke 19 and the arms 16 forwardly and upwardly and thereby raise the cultivator elements to their inoperative position out of contact with the ground.

It is to be understood that all of the previously described parts are conventional and do not per se form a part of the present invention, except where they cooperate with the distributor mechanism to render the same operative and inoperative, as will be discussed in detail hereinafter.

Referring to Figures 1, 2 and 4, the numeral 26 designates one of a pair of distributor supporting frames which are mounted upon opposite sides of the tractor, as clearly shown in Figure 2. Each frame is substantially rectangular in formation and consists of longitudinal side bars 27 and 28, respectively, preferably of angle iron formation in cross-section. These bars are connected at opposite ends to front and rear cross bars 29 and 30, respectively.

The front bar 29 is of inverted angle iron formation in cross section facing inwardly, while the rear bar 30 consists of a vertically extending strip secured at its ends to the longitudinal side bars 27 and 28. Separate brackets 31 and 32 support the frame 26. Each bracket comprises cross rods 29' and 30' connected to the undersides of the cross bars 27 and 28. These rods are also connected to vertically extending rods 31' and 32', respectively. Diagonal bracing arms 33 preferably connect the rods 31' and 32' with their respective cross rods 29' and 30'.

Each front and rear bracket is preferably secured to the tractor frame adjacent its lower end, and the front rods 31' are connected to each other by tie rods 34 which pass through openings in the tractor above the main frame or chassis 12. In like manner, the rear rods 32' are connected by a rear tie rod 35. In this manner, each distributor supporting frame may be easily and quickly attached to a side of the tractor.

A further connecting means between the tractor and each frame 26 comprises a truss-rod 36. Each rod has its rear end connected to the outer front corner of the frame 26, while its forward end is passed through an opening in, and bolted to, one end of a nose iron 37. This iron is secured to the front of the radiator casing 38 of the tractor.

Referring particularly to Figures 1 and 3, the numeral 39 designates generally a fertilizer distributing mechanism consisting of a bed plate 40, a lower hopper section 41 secured thereto, and an upper hopper section 42 preferably detachably connected to the section 41. Within the bed plate and the lower end of the hopper portion 41 is journaled a screw conveyor or auger 43. The rear conveyor stub shaft 44 passes through a bearing 45 formed integrally with a wall of the hopper section 41, and has mounted thereon a large gear 46. This gear normally meshes with a small gear or pinion 47 which is located below and to one side of the gear 46. Gear 47 is fixed to a stub shaft 48 which is journaled in front and rear bearings 50 and 49, respectively. The front bearing 50 is formed integral with a plate 51 or intermediate cross bar which is bolted to the longitudinal bars 27 and 28 and extends entirely across the frame 26. This plate also constitutes a support for the rear end of the distributor mechanism 39.

The rear bearing 49 is loosely mounted on a cross shaft 52 which is journaled in bearings 53 and 54 carried by the bars 27 and 28, respectively. A regulating pinion 55 is fixed to shaft 48 and meshes with a multiple gear 56 mounted on the shaft 52 to rotate therewith. By moving the regulating pinion 55 on the shaft 48, relative to the gear 56, the speed of rotation of the conveyor 43 may be varied, as desired. The shaft 52 (see Figure 1) extends outwardly beyond the bar 27 and supports a sprocket wheel 57. A sprocket wheel 58 is mounted on the drive shaft of the tractor and transmits rotation to the shaft 52 through a sprocket chain 59. Thus, when the tractor is operated, power will be transmitted to the shaft 52 and multiple gear 56, which will impart rotation to the stub shaft 48 through the regulator pinion 55. This will rotate gears 46 and 47 and operate the screw conveyor to gradually move the fertilizer or other material to be distributed, forwardly in the lower end of the hopper to discharge openings which connect with the distributor ribbon spouts 60. These ribbons (see Figure 1) extend downwardly upon opposite sides of the tractor and discharge the material in the vicinity of the cultivator elements 11.

Referring to Figures 2, 3 and 4, it will be observed that the forward cross bar 29 is provided with a top flange 61. This flange is provided with a pair of spaced upstanding ears 62 having aligned openings 63 for receiving a shaft 64. The extreme front portion of the bed plate 40 is provided with bosses or lugs 65 having aligned openings through which the shaft 64 passes and which cooperate therewith to pivotally mount the distributor on the frame. Thus, the distributor may swing about the shaft 64 as a pivot to raise or lift its rear end and in so doing, disengage the gear 46 from the gear 47, whereby the screw conveyor is rendered inoperative to feed any material to the discharge ribbons 60.

The means for effecting disengagement of the gears 46 and 47 is shown in Figures 1, 2 and 3. A pulley support 66 is mounted on the plate 51 to one side of the hopper section 41 and pivotally supports a pulley 67. It will be observed that the pulley is located above the lower rear end of the hopper section 41, and that a lift bar or arm 68 is rigidly connected to and projects outwardly from the hopper section 41. This bar, in the normal operative position of the hopper, rests upon the plate 51 adjacent to and below the pulley 67. A flexible cable or chain 69 has one end thereof secured to the outer end of the lift bar 68 and passes up and over the pulley 67. This chain then extends forwardly (see Figures 1 and 2) and has its other extremity secured to the closed end of the yoke or link 19.

The present construction thus utilizes the operating means for the cultivating elements to also render the feeding and distributing means inoperative. That is, when the lever 25 is moved forwardly to raise the cultivator elements 11 to their inoperative position, the forward movement of the yoke 19 effects a pull on the chain 69. This action moves the chain about the pulley 67 and thereby raises the lift bar 68. The raising of the lift bar 68 also raises the rear end of the hopper about its pivot and in so doing, disengages the gear 46 from the gear 47. This prevents rotation of the screw conveyor 43 and thus renders the feeding means inoperative. When the lever 25 is moved to the rear to again lower the cultivating elements to their ground-engaging position, the chain 69 is allowed to move rearwardly over the pulley 67 to thereby permit the hopper to be lowered to its normal position with the gears 46 and 47 again in mesh. As soon as the gear 46 engages gear 47, screw conveyor 43 will be rotated to again feed the material to the ribbons 60.

Referring now to Figure 5, there is disclosed a modified form of the invention which is particularly adapted to be used in connection with tractors which do not have operating rods similar to the rods 18. However, it is to be assumed that the tractor, upon which this modified structure is utilized, is provided with means for raising and lowering cultivating implements into and out of ground-engaging position. In this connection, the lever 70 controls the operation of the cultivating mechanism (not shown) through the rod 71. The lever is provided with an integral extension 72 projecting downwardly from its pivot point 73 and having means for connecting it to one end of a cable or chain 74. This chain extends forwardly and passes around a pulley 75 mounted on a bracket 76 which is supported upon a frame member 77 preferably forming a part of the tractor construction. The chain then passes upwardly and over a pulley 78 mounted on a bracket 79 which is similar in all respects to the above-described bracket 66. In other words, the pulley 78 and bracket 79 are mounted on a cross plate 80 which, in turn, is supported on a distributor supporting frame 81 similar to the frame 26. A lift bar 82 extends outwardly from the hopper (not shown) and normally rests upon the plate 80 below the pulley 79 similar to the lift bar 68.

With this construction, and assuming that the lever 70 is moved forwardly to render the cultivating implements inoperative, this movement will also move the extension 72 rearwardly. The chain 74 being attached thereto will be pulled rearwardly about the pulleys 75 and 78 and thus raise the lift bar 82 and with it, the rear end of its hopper. It is, of course, to be understood that this hopper is identical with the hopper 41 and that such lifting operation will disengage a set of gears, thereby rendering the screw conveyor inoperative.

While the distributor is illustrated and described as being attached to two types of farm implements, it is to be understood that changes may be made to adapt it to other types of farm tractors whereby operation of the cultivator implements will also operate means to effect an engagement and disengagement of the distributor feeding means.

It is to be further understood that the frame supporting braces need not be directly secured to the ends of the rods 27 and 28, but, if desired, may be connected to the frame intermediate its ends. The main requisite is that the frame be supported substantially in a horizontal position at one side of the tractor and, in turn, support the distributor mechanism. It is also to be understood that the invention is not limited to the details of construction shown in the drawings, and that the phraseology employed in the specification is for the purpose of description and not of limitation.

I claim:

1. In a device of the character described, a hopper supporting frame adapted to be detachably mounted on one side of a tractor, said frame being of substantially rectangular formation and including end cross bars and an intermediate cross bar, distributing mechanism supported on said frame, said mechanism including a hopper having one end thereof pivoted on one of the end cross bars and having its other end normally resting on the intermediate cross bar, feeding means mounted in said hopper, operating means for said feeding means including a pair of normally meshed gears, one carried by the hopper and the other supported on said frame, a pulley mounted on said intermediate cross bar to one side of and above the lower edge of the free end of the hopper, and a flexible cable having one end thereof connected to the lower edge of the free end of the hopper and passing up and over said pulley, whereby a pull on said cable beyond the pulley will raise the free end of the hopper and disengage the gears to render the feeding means inoperative.

2. In a device of the character described, a hopper supporting frame adapted to be detachably mounted on one side of a tractor, said frame being of substantially rectangular formation and including end cross bars and an intermediate cross bar, distributing mechanism supported on said frame, said mechanism including a hopper having one end thereof pivoted on one of the end cross bars and having its other end normally resting on the intermediate cross bar, feeding means mounted in said hopper, operating means for said feeding means including a pair of normally meshed gears, one carried by the hopper and the other supported on said frame, a pulley mounted on said intermediate cross bar to one side of and above the lower edge of the free end of the hopper, an arm fixed to and projecting laterally from the lower portion of the free end of the hopper, the outer end of said arm normally positioned adjacent to and below said pulley, and a flexible cable having one end thereof connected to said arm adjacent its outer end and passing up and over said pulley, whereby a pull on said cable beyond the pulley will raise the arm and hopper about its pivot and disengage the gears to render the feeding means inoperative.

3. In a device of the character described, a tractor having cultivating implements mounted thereon, means for moving said implements into and out of operative position including a rod movably mounted longitudinally of the tractor, a hopper supporting frame mounted on one side of the tractor, a distributing mechanism supported on said frame, said mechanism including a hopper having one end thereof pivoted on said frame to swing about a horizontal axis, feeding means mounted in said hopper, operating means for said feeding means including a pair of normally meshed gears, one carried by the hopper and the other supported on said frame, and means operatively connecting the lower portion of the other end of the hopper to said longitudinally movable rod, whereby upon movement of said rod to render the cultivating implements inoperative, the hopper will be moved about its pivot to disengage the gears and render the feeding means inoperative.

4. In a device of the character described, a tractor having cultivating implements mounted thereon, means for moving said implements into and out of operative position including a rod movably mounted longitudinally of the tractor, a hopper supporting frame mounted on one side of the tractor, a distributing mechanism supported on said frame, said mechanism including a hopper having one end thereof pivoted on said frame to swing about a horizontal axis, feeding means mounted in said hopper, operating means for said feeding means including a pair of normally meshed gears, one carried by the hopper and the other supported on said frame, a pulley mounted on said frame adjacent to and above the lower edge of the free end of the hopper, and a flexible cable having one end thereof connected to the lower edge of the free end of the hopper and passing up and over said pulley, the other end of said cable being operatively associated with said longitudinally movable rod, whereby movement of said rod to render the cultivating implements inoperative will effect a pull on the cable to swing the hopper about its pivot and disengage the gears to render the feeding means inoperative.

5. In a device of the character described, a tractor having cultivating implements mounted thereon, means for moving said implements into and out of operative position including a rod movably mounted longitudinally of the tractor, a substantially inverted U-shaped yoke straddling the rod and pivoted thereto adjacent the closed end of the yoke, the legs of the yoke being associated with the cultivator elements, a hopper supporting frame mounted on one side of the tractor, distributing mechanism supported on said frame, said mechanism including a hopper having one end thereof pivoted on said frame to swing about a horizontal axis, feeding means mounted in said hopper, operating means for said feeding means, including a pair of normally meshed gears, one carried by the hopper and the other supported on said frame, a pulley mounted on said frame adjacent to and above the lower edge of the free end of the hopper, and a flexible cable having one end thereof connected to the lower edge of the free end of the hopper and passing up and over said pulley, the other end of said cable being connected to said yoke adjacent its closed end, whereby movement of said rod and yoke to render the cultivating implements inoperative will effect a pull on the cable to swing the hopper about its pivot and disengage the gears to render the feeding means inoperative.

6. In a device of the character described, a tractor having cultivating implements mounted thereon, means for moving said implements into and out of operative position including a hand lever pivotally mounted adjacent the rear of the tractor, a hopper supporting frame mounted on one side of the tractor, a distributing mechanism supported on the frame, said mechanism including a hopper having its front end pivoted on said frame to swing about a horizontal axis, feeding means mounted in said hopper, operating means for said feeding means including a pair of normally meshed gears, one carried by the hopper and the other supported on said frame, a pulley mounted on said frame adjacent to and above the lower edge of the free end of the hopper, a second pulley mounted on the tractor below the first pulley, and a flexible cable having one end thereof connected to the lower edge of the free end of the hopper and passing forwardly over said first mentioned pulley, then downwardly to the second pulley and then rearwardly over said second pulley, the rear end of said cable being connected to said hand lever whereby movement of said hand lever to render the cultivating implements inoperative will effect a pull on the cable to swing the hopper about its pivot and disengage the gears to render the feeding means inoperative.

JOHN BLUE.